(12) United States Patent
Tang

(10) Patent No.: US 7,880,953 B2
(45) Date of Patent: Feb. 1, 2011

(54) SPECIAL OPTICAL MODULATION ARRAY DEVICE AND A METHOD OF FABRICATING THE SAME

(75) Inventor: Deming Tang, Shanghai (CN)

(73) Assignee: Shanghai Lexvu Opto Microelectronics Technology Co., Ltd, Shanghai (CN)

( * ) Notice: Subject to any disclaimer, the term of this patent is extended or adjusted under 35 U.S.C. 154(b) by 0 days.

(21) Appl. No.: 12/613,227

(22) Filed: Nov. 5, 2009

(65) Prior Publication Data

US 2010/0110528 A1  May 6, 2010

Related U.S. Application Data

(60) Provisional application No. 61/112,092, filed on Nov. 6, 2008.

(51) Int. Cl.
  *G02B 26/00* (2006.01)
(52) U.S. Cl. .................................................. 359/291
(58) Field of Classification Search ................ 359/291, 359/290, 292, 293, 295, 298, 223, 224, 237, 359/320, 323, 324
  See application file for complete search history.

(56) References Cited

U.S. PATENT DOCUMENTS

| | | | |
|---|---|---|---|
| 5,999,303 A * | 12/1999 | Drake | 359/224.1 |
| 6,072,620 A | 6/2000 | Shiono et al. | 359/290 |
| 6,215,579 B1 | 4/2001 | Bloom et al. | 359/298 |
| 6,268,948 B1 | 7/2001 | Gelbart | 359/231 |
| 7,064,883 B2 | 6/2006 | Payne et al. | 359/290 |
| 7,261,430 B1 * | 8/2007 | DeNatale et al. | 359/871 |

* cited by examiner

*Primary Examiner*—Ricky L Mack
*Assistant Examiner*—Tuyen Q Tra
(74) *Attorney, Agent, or Firm*—J.C. Patents

(57) ABSTRACT

A spatial optical modulation array device includes regularly packed micro optical-electrical-mechanical pixels in a planner configuration on a semiconductor substrate, each pixel electrically actuated independently and thus operated optically in the binary modes, reflection and diffraction to incident illumination. Subject to the electrostatic contraction or compulsion driven by a pixel circuitry, the top metal reflector is placed accurately at the minimum or maximum spacing from the static bottom metal reflector in an odd or even integral multiple of a quarter wavelength within visual light spectrum, so that diffraction or reflection in destructive or constructive interference is achieved respectively and thus incident illumination modulated independently in closely binary modes at each micro optical-electrical-mechanical pixel.

16 Claims, 6 Drawing Sheets

SPECIAL OPTICAL MODULATION ARRAY DEVICE AND A METHOD OF FABRICATING THE SAME

CROSS-REFERENCE TO RELATED APPLICATIONS

This application claims priority of provisional application No. 61/112,092, filed on Nov. 6, 2008, entitled "Micro Electrical Mechanical Spatial Optical Diffractive Modulation Array", which is incorporated herein by reference in its entirety.

FIELD OF THE TECHNOLOGY

The present invention relates to reflective spatial optical modulation, and more particularly to a spatial optical modulation array device and a method of manufacturing the same.

BACKGROUND

A reflective spatial optical modulation array device is made of regularly tiled co-planner pixels, each of which can individually and independently modulate and reflect a beam of incident illumination in a spatial pattern that corresponds to an electrical input to the device and its individual pixels. The incident illumination can be modulated in intensity, phase, polarization or direction of its reflection. A Digital Mirror Device (DMD) and a Liquid Crystal On Silicon (LCOS) are two among popularly used dimensional reflective spatial optical modulation array devices.

A galvanic light valve (GLV) offer an alternative two dimensional reflective optical modulation solution to the DMD and LCOS, with promised further improvement in (a) gray-scale capability, (b) modulation speed, and (c) optical efficiency. Though a micro optical-electrical-mechanical system (MOEMS) device, the design and construction of reported GLV devices disclosed in the prior art are not readily manufacturable in semiconductor fabrication practice, with acceptable precision tolerance required for its complicated MOEMS array microstructures and reasonable device yield for production.

SUMMARY

Some aspects of the present invention provide an overall solution to existing problems in both device design and manufacturability.

One aspect of the present invention discloses an MOEM pixel structure providing modulation of incident illumination in a closely binary precision mode of reflection or diffraction over a wide spectrum of light wavelength. The pixel structure in one embodiment includes a static bottom metal reflector built on a semiconductor substrate containing a CMOS-based pixel circuitry, and a pairing top metal reflector on top of a rigid composite plate which is readily movable vertically but always remains in parallel to the static bottom reflector. Upon similar or opposite electrical charging by the pixel circuitry, the top metal reflector moves farther from or closer to the static bottom metal reflector due to electrical compulsion or attraction. The suspended rigid composite plate is mechanically supported above the semiconductor substrate with its top metal reflector electrically connected to the pixel circuitry by a set of bendable arms.

To displace the rigid composite plate in a precise proxy distance but in parallel to the semiconductor substrate and the static bottom metal reflector by electrical contraction, a set of minimum spacing limiters are fabricated, preferably at the bottom sides of the bendable arms close to the rigid composite plate, and offer the even physical limits of the most minimum spacing between the two metal reflectors. Similarly, to displace the rigid composite plate in a precise farther distance from but still in parallel to the semiconductor substrate by electrical compulsion, a set of maximum spacing limiters are constructed and fixed with the semiconductor substrate, preferably above the top side of the bendable arms, and offer the even opposite physical limits to the vertical upward movement of the top metal reflector away from the static bottom metal reflector. Also, a set of optical apertures are fabricated in and allow incident illumination through the movable rigid composite plate unto the bottom metal reflector to form the pair of optical reflectors in a variable distance along incident illumination. The optical apertures are shaped in any one of planner closed figures including circles, rings, ellipses, and polygons but preferably those apertures are sized to define an area with reflectivity substantially equal to the reflectivity of the area of the top metal reflector surrounding the apertures.

In one embodiment, such an MOEM pixel structure is constructed such that in a quiescent state, the minimum spacing between the two metal reflectors, confined by the set of minimum spacing limiters, equal to n*lambda/4 wavelength, where lambda is a particular wavelength of light incident on the two metal reflectors, and n is an odd integer equal to or greater than 1. By contrast, in an opposite, active state, the maximum spacing between the two metal reflectors, confined by the set of maximum spacing limiters, equal to m*lambda/4 wavelength, and m is an even integer equal to or greater than 2.

In another embodiment, the rigid composite plate may further includes a bottom conductive metal layer, providing both electrical charging in pair with and above the static bottom metal reflector in electrical connection through the bendable arms, and the residual stress balance to the physical mismatch between the rigid base plate and top metal reflector in the rigid composite plate.

BRIEF DESCRIPTION OF THE DRAWINGS

The depicted and various other features of the present invention in this disclosure with shown advantages shall be evident upon comprehension of the following detailed description in conjunction with the accompanying drawings and the appended claims provided below, where:

FIG. 1a is a side view of FIG. 1 and FIG. 1b is a top view of FIG. 1;

DETAILED DESCRIPTION

A spatial optical modulation array device 5 and its fabrication process according to the present invention will now be described with reference to FIGS. 1 through 5.

Figure 1:
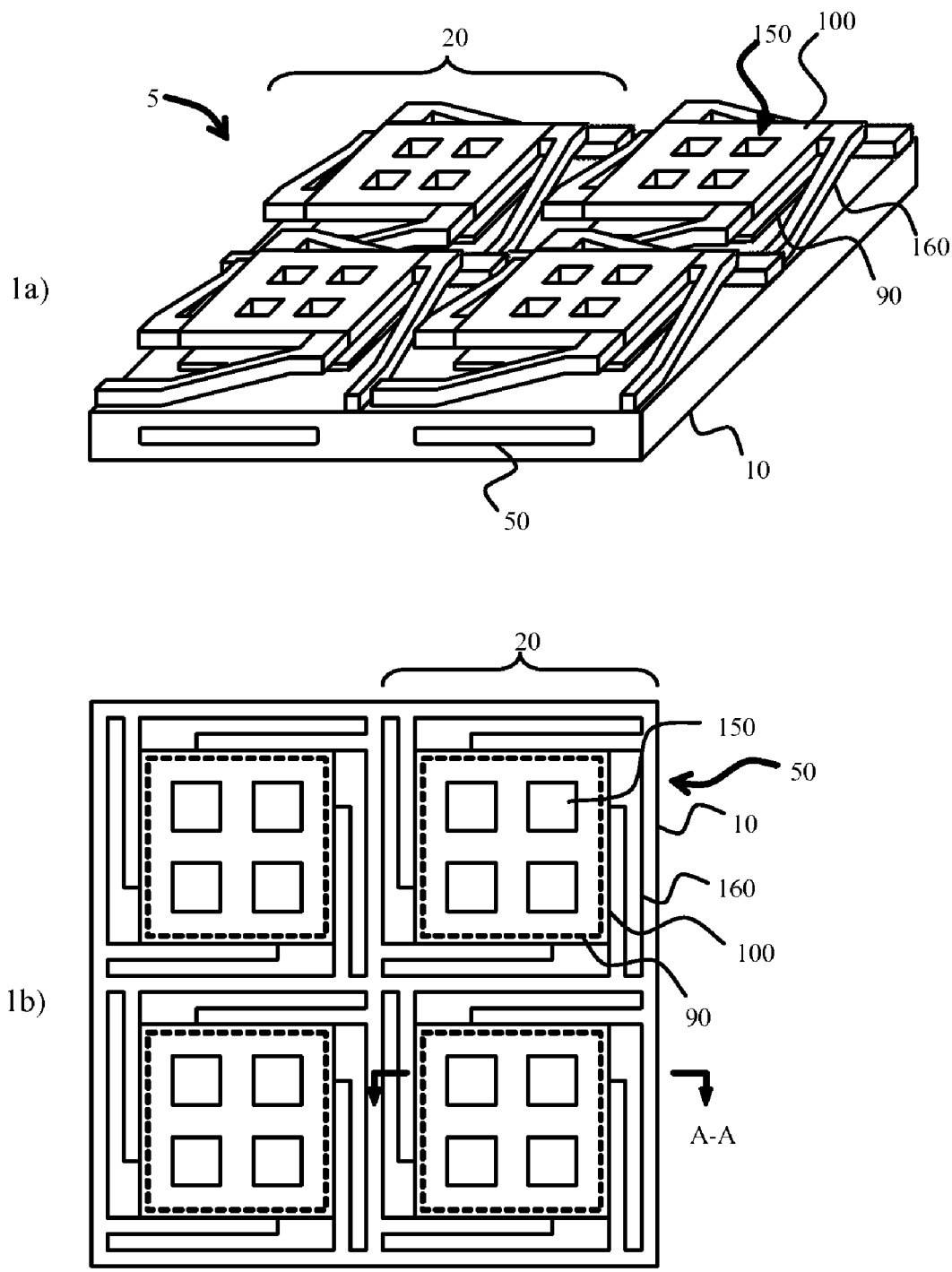
FIG. 1 illustrates an exemplary portion of a spatial optical modulation array device 5 including 4 by 4 micro optical-electrical-mechanical pixels 20 according to an embodiment of the present invention.
Figure 2:
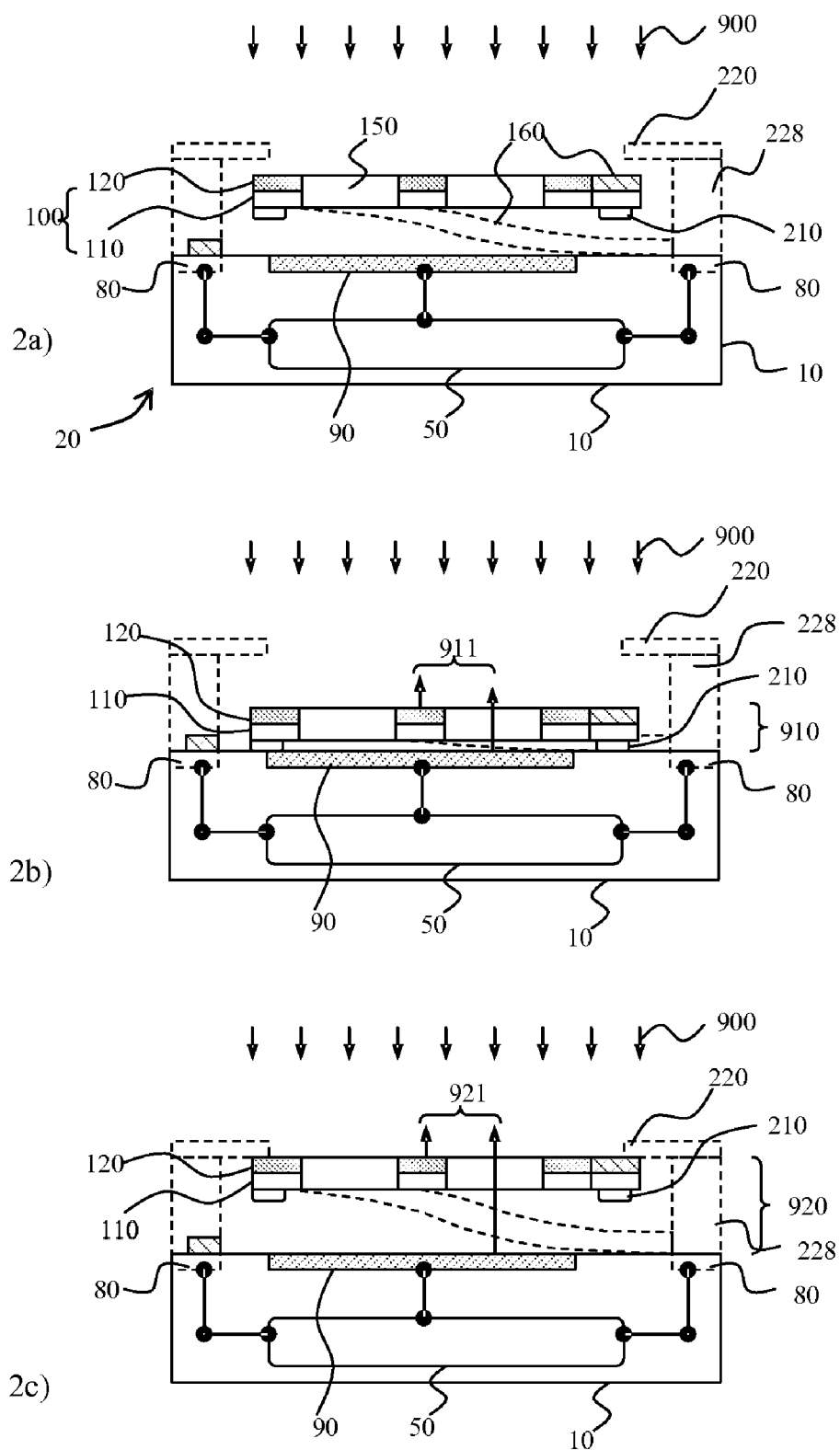
FIGS. 2a, 2b and 2c are three cross section views of a single micro optical-electrical-mechanical pixel 20 along the cross section A-A in FIG. 1.

FIG. 1 illustrates an exemplary portion of a two-dimensional spatial optical modulation array device 5 including 4 by 4 micro optical-electrical-mechanical pixels 20 according to an embodiment of the present invention; FIG. 1a is a side view of FIG. 1 and FIG. 1b is a top view of FIG. 1. The micro optical-electrical-mechanical pixels 20 are regularly tiled in a planner configuration on a semiconductor substrate 10. Each single micro optical-electrical-mechanical pixel 20 is composed of a vertically movable re semiconductor reflective rigid composite plate 100 having a set of apertures 150, suspended above but via a set of bendable arms 160, electrically and physically connected to the semiconductor substrate 10 containing a static bottom metal reflector 90 and a pixel circuitry 50.

FIG. 2a is the cross-sectional view of one micro optical-electrical-mechanical pixel 20 along the cross section A-A in FIG. 1. The reflective rigid composite plate 100 including a top metal reflector 120 adhered to a rigid base plate 110, is suspended above but in parallel to the static bottom metal reflector 90 on the semiconductor substrate 10 in which the pixel circuitry 50 is embedded. The suspended reflective rigid composite plate 100 is mechanically supported above the semiconductor substrate 10 by a set of electrically conductive and mechanically bendable arms 160 which electrically connects the top metal reflector 120 to the pixel circuitry 50 via a set of electrical connectors 80. The bendable arms 160 and the rigid base plate 110 are exposed to but absorb the incident illumination 900.

Also electrically connected to the pixel circuitry 50, the static bottom metal reflector 90 joins the top metal reflector 120 on the reflective rigid composite plate 100 suspended above the semiconductor substrate 10, forming a pair of electrically charged but physically separated metal planner electrodes in parallel. By charging this pair of planner metal electrodes controlled through the pixel circuitry 50, either a contractive or compulsive electrostatic force is generated, pulling the reflective rigid composite plate 100 closer to or pushing it away farther from the static bottom metal reflector 90 on the semiconductor substrate 10, as shown in FIGS. 2b and 2c respectively. The reflective rigid composite plate 100 is fabricated as an even flat plate but stiffened in terms of bending stiffness by the rigid base plate 110. Meanwhile, longitudinal bending of the bendable arms 160, with less longitudinal bending stiffness, provides means of moving the reflective rigid composite plate 100 relatively to the static bottom metal reflector 90 and the semiconductor substrate 10. With the reflective rigid composite plate 100, the bendable arms 160 and the static bottom metal reflector 90 as well as the semiconductor substrate 10 structurally constructed evenly, electrical charge and thus electrostatic force are also kept evenly distributed, so that while moving vertically upon electrostatic force, the reflective rigid composite plate 100 is constantly kept in parallel to the static bottom metal reflector 90 and the semiconductor substrate 10.

Both the top metal reflector 120 and the static bottom metal reflector 90 are optically reflective over the visible spectrum of light, while the array of apertures 150 allows incident illumination 900 through the reflective rigid composite plate 100 onto the static bottom metal reflector 90. As the relative spacing between the top metal reflector 120 and the static bottom metal reflector 90 is altered, reflected light from the static bottom metal reflector 90 produces either constructive or destructive interference with light reflected by the top metal reflector 120, and thereby modulates light incident on the micro optical-electrical-mechanical pixel 20.

A spatial optical modulation array device 5 disclosed hereby includes a plurality of such micro optical-electrical-mechanical pixels 20 arranged in a regularly tiled pattern and operated to form a planner array of any configuration or size on the semiconductor substrate 10. The embodiment in FIG. 1 only shows an array of 4 by 4 micro optical-electrical-mechanical pixels 20 square-shaped in a square planner configuration. However it will be apparent to those skilled in the art that the spatial optical modulation array device 5 can include a number of such micro optical-electrical-mechanical pixels 20 in any configuration including square, triangular, hexagonal and circular.

The size and position of each of the apertures 150 are predetermined to meet an equivalent reflectivity requirement. That is the total reflectivity of the defined part of the static bottom metal reflector 90 by the vertically projected area of all the apertures 150 within a micro optical-electrical-mechanical pixel 20 is equal to the total reflectivity of the remaining area of the top metal reflector 120 of the outside the aperture 150. While square apertures 150 are drawn in FIG. 1 to illustrate the principle, other aperture shapes are also possible, including rings, ellipses, triangles, rectangles and polygons.

The reflective rigid composite plate 100 with the top metal reflector 120 is electrically actuated to move up or down over a very small distance (only a fraction of the wavelength of light) also in a small spacing relative to the static bottom metal reflector 90 by electrostatic forces initiated by the pixel circuitry 50. Preferably, such a spacing by actuation is I*lambda/4 wavelength, where lambda is a particular wavelength of incident illumination 900, and I is an integer equal to or greater than 0. If such spacing is an odd multiple of a quarter wavelength of the incident illumination 900, i.e., equal to n*lambda/4 where n is an odd integer, a destructive interference is formed. In contrast, if the spacing is an even multiple of a quarter wavelength of the incident illumination 900, i.e., equal to m*lambda/4 where m is an even integer larger than 0, a constructive interference is accomplished on this micro optical-electrical-mechanical pixel 20.

Preferably, both the static bottom metal reflector 90 and the top metal reflector 120 are made of a metal or metal alloy with high reflectivity such as aluminum and aluminum rich alloy, silver and silver-rich alloy. Alternatively, an antireflective and reflectivity enhancing coating may be applied onto the two metal reflectors. Also preferably, the rigid base plate 110 may be made of a dielectric with high elastic modulus such as silicon oxide, silicon nitride and silicon carbide.

As illustrated in FIGS. 2a, 2b and 2c, a set of minimum spacing limiters 210 are fabricated between the top metal reflector 120 and the static bottom metal reflector 90 on the semiconductor substrate 10 in another embodiment disclosed in the present invention. This set of the minimum spacing limiters 210 provide physical limitation between the bottom surface of the reflective rigid composite plate 100 and the top surface of the static bottom metal reflector 90 on the semiconductor substrate 10 as the reflective rigid composite plate 100 being pulled close to the static bottom metal reflector 90 by the contractive electrostatic charging mentioned above. In one preferable configuration, the minimum spacing limiters 210 are fabricated at the bottom of bendable arms 160 to the reflective rigid composite plate 100. Alternatively, they could also be placed on top of the top surface of the semiconductor substrate 10 with the static bottom metal reflector 90 in another preferable configuration. The vertical dimension of the minimum spacing limiters 210 are precisely controlled in fabrication so that the net vertical distance of a minimum spacing 910 between the top metal reflector 120 on the rigid composite plate 100 and the static bottom metal reflector 90 on the semiconductor substrate 10, under contraction, equal to n*lambda/4 where n is an odd integer and lambda is a particularly selected wavelength of incident illumination 900 so that a destructive interference is achieved, as shown in FIG. 2b.

Also illustrated in FIGS. 2a, 2b and 2c, a set of maximum spacing limiters 220 fixed on a set of solid posts 228 are fabricated unto the semiconductor substrate 10. The vertical dimension of the maximum spacing limiters 220 and the solid posts 228 are precisely set so that the net vertical distance of the minimum spacing 910 between the top metal reflector 120 on the rigid composite plate 100 and the static bottom metal reflector 90 on the semiconductor substrate 10, under compulsion, equal to m*lambda/4 where m is an even integer larger than 0 and lambda is a particularly selected wavelength of incident illumination 900 so that a constructive interference is formed, as shown in FIG. 2c. Preferably, the maximum spacing limiters 220 are overlaid adequately with the upper portion of the bendable arms 160 closer to the reflective rigid composite plate 100 without blocking incident illumination to the top metal reflector 120.

Each of the micro optical-electrical-mechanical pixels 20 is electrically actuated independently and thus operated optically in the binary modes, reflection and diffraction to incident illumination. Subject to the electrostatic contraction or compulsion driven by a pixel circuitry, the top metal reflector 120 is placed accurately at the minimum or maximum spacing from the static bottom metal reflector in an odd or even integral multiple of a quarter wavelength within visual light spectrum, so that diffraction or reflection in destructive or constructive interference is achieved respectively and thus incident illumination modulated independently in closely binary modes at each micro optical-electrical-mechanical pixel.

With the design and construction of the spatial optical modulation array device 5 in the present embodiment, the device is greatly simplified comparing with the conventional complicated MOEMS array microstructures disclosed in the prior art so it can be readily manufacturable in semiconductor fabrication practice with acceptable precision tolerance required.

Figure 3:
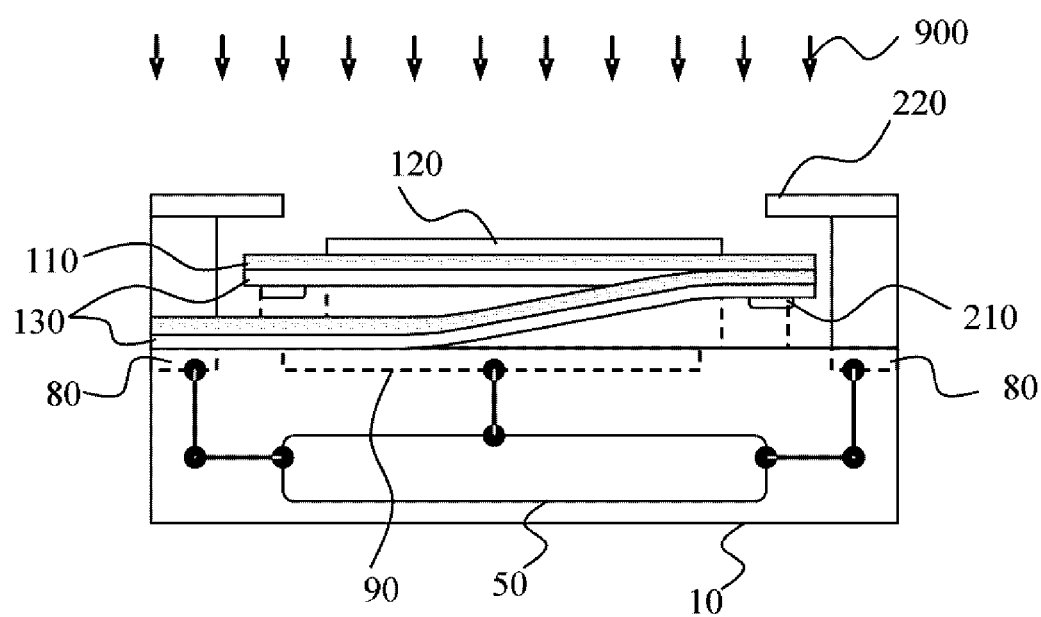
FIG. 3 is a cross section view of a single micro optical-electrical-mechanical pixel 20 along the cross section A-A in FIG. 1 according to another embodiment of the present invention.

FIG. 3 illustrates another embodiment disclosed in the present invention, particularly on the physical structure of the reflective rigid composite plate 100 and its electrical connection with the pixel circuitry 50 on the semiconductor substrate 10. In this embodiment, a bottom conductive metal layer 130 (i.e. a third reflective metal layer 135) is fabricated continuously at the bottom side of both the reflective rigid composite plate 100 and its affiliating bendable arms 160, which serves as both the vertically movable electrostatic charging plate opposite to the static bottom metal reflector 90 and electrically connects to the pixel circuitry 50 on the semiconductor substrate 10. The sandwich composite film structure in this embodiment provides means for: 1) further enhancing the bending stiffness of the vertically movable reflective rigid composite plate 100; 2) balancing the mismatch of thermal expansion between the top metal reflector 120 and the rigid base plate 110 and thus, reducing the residual stress due to physical mismatch between the rigid base plate 110 and the top metal reflector 120 and bending on the reflective rigid composite plate 100; 3) reducing the net vertical spacing between the static bottom metal reflector 90 and the bottom conductive metal layer 130 as the pair of opposite electrical charging plates for actuating the reflective rigid composite plate 100; 4) optimizing the reflectivity on the top metal reflector 120 and the electrical conduction on the bottom conductive metal layer 130 separately. In a further embodiment of this invention, the bendable arms 160 do not include reflective metal on their top side and thus is kept optically opaque to the incident illumination 900. Such differentiation in the film composite structure between the reflective rigid composite plate 100 and its affiliating optically opaque bendable arms 160 is achieved by selectively patterning and removing the top metal layer on the bendable arms 160 by etching but keeping the top metal reflector 120 adherent to the rigid base plate 110. The bottom conductive metal layer 130 provides direct means for electrical connection to the electrical connectors 80 to the pixel circuitry 50 in the semiconductor substrate 10.

Preferably, the bottom conductive metal layer 130 is either a simple metal layer or a composite conductive layer including typical interconnect metal and alloys, such as aluminum and aluminum alloy, titanium and alloy, as well as conductive metal compounds including titanium nitride.

Figure 4:
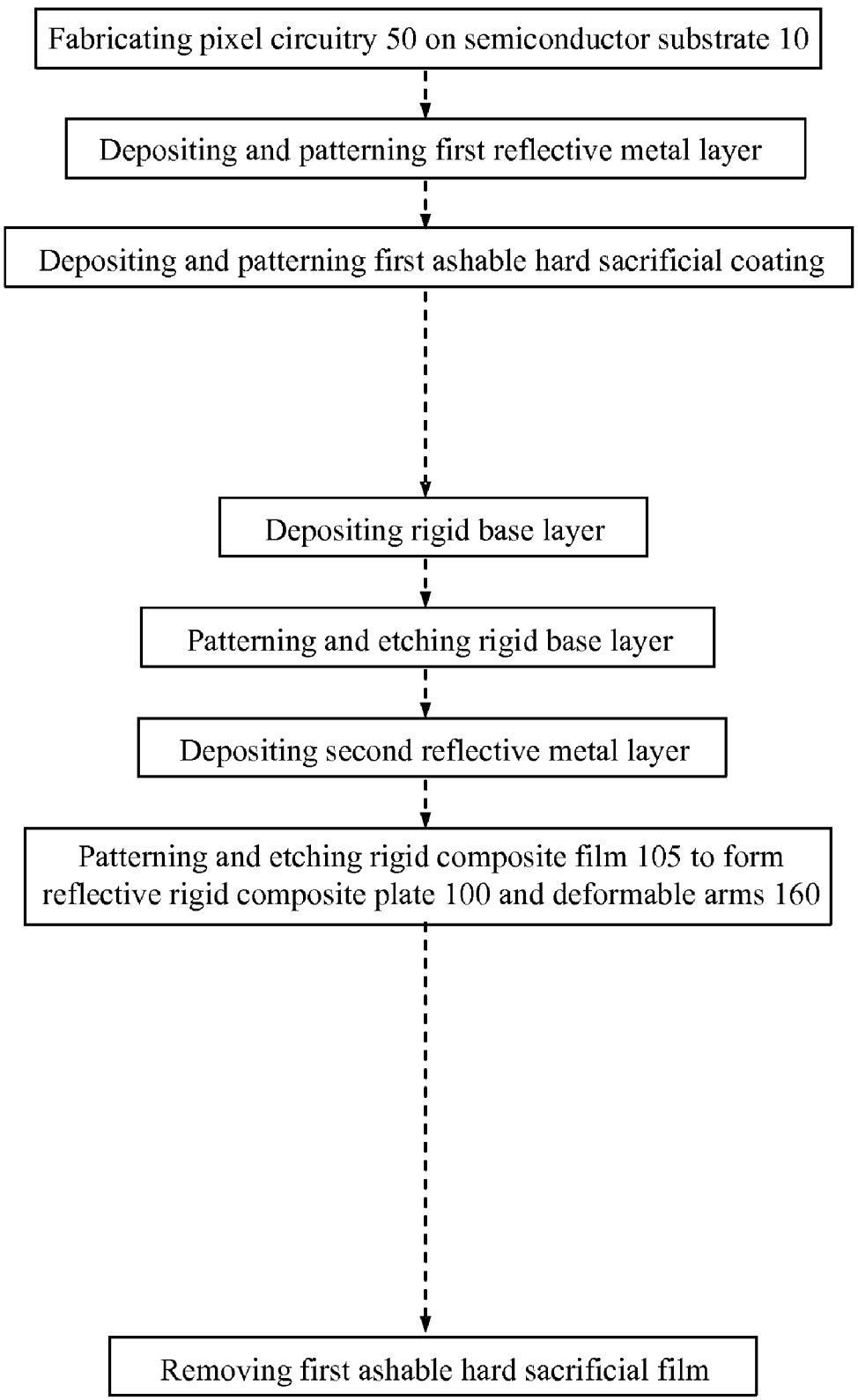
FIG. 4 is a block diagram of the method of fabricating a spatial optical modulation array device in one embodiment disclosed in this invention.

FIG. 4 illustrates a method for fabricating the micro optical-electrical-mechanical pixel 20 as shown in FIG. 1 in one embodiment disclosed in the present invention. The method may include the following steps, readily implementable in a semiconductor manufacturing practice: 1) Fabricating a pixel circuitry 50 on a semiconductor substrate 10; 2) depositing and photolithographically patterning a first reflective metal layer on the semiconductor substrate 10 to form the static bottom metal reflector 90; 3) depositing and photolithographically patterning a first ashable hard sacrificial coating conformal onto the static bottom metal reflector 90 and the semiconductor substrate 10 to form a first ashable hard sacrificial film; 4) depositing a rigid base layer conformal onto the first ashable hard sacrificial film and the semiconductor substrate 10 continuously; 4) photolithographically patterning and selectively etching the rigid base layer to form openings for the electrical wiring to the pixel circuitry 50; 5) depositing a second reflective metal layer conformably onto the rigid base layer to form a rigid composite film on the patterned first ashable hard sacrificial film and the semiconductor substrate 10; 6) photolithographically patterning and selectively etching the rigid composite film to form the reflective rigid composite plate 100 and the associating bendable arms 160; 7) removing the first ashable hard sacrificial film underneath the rigid composite film by oxygen ashing.

Figure 5:
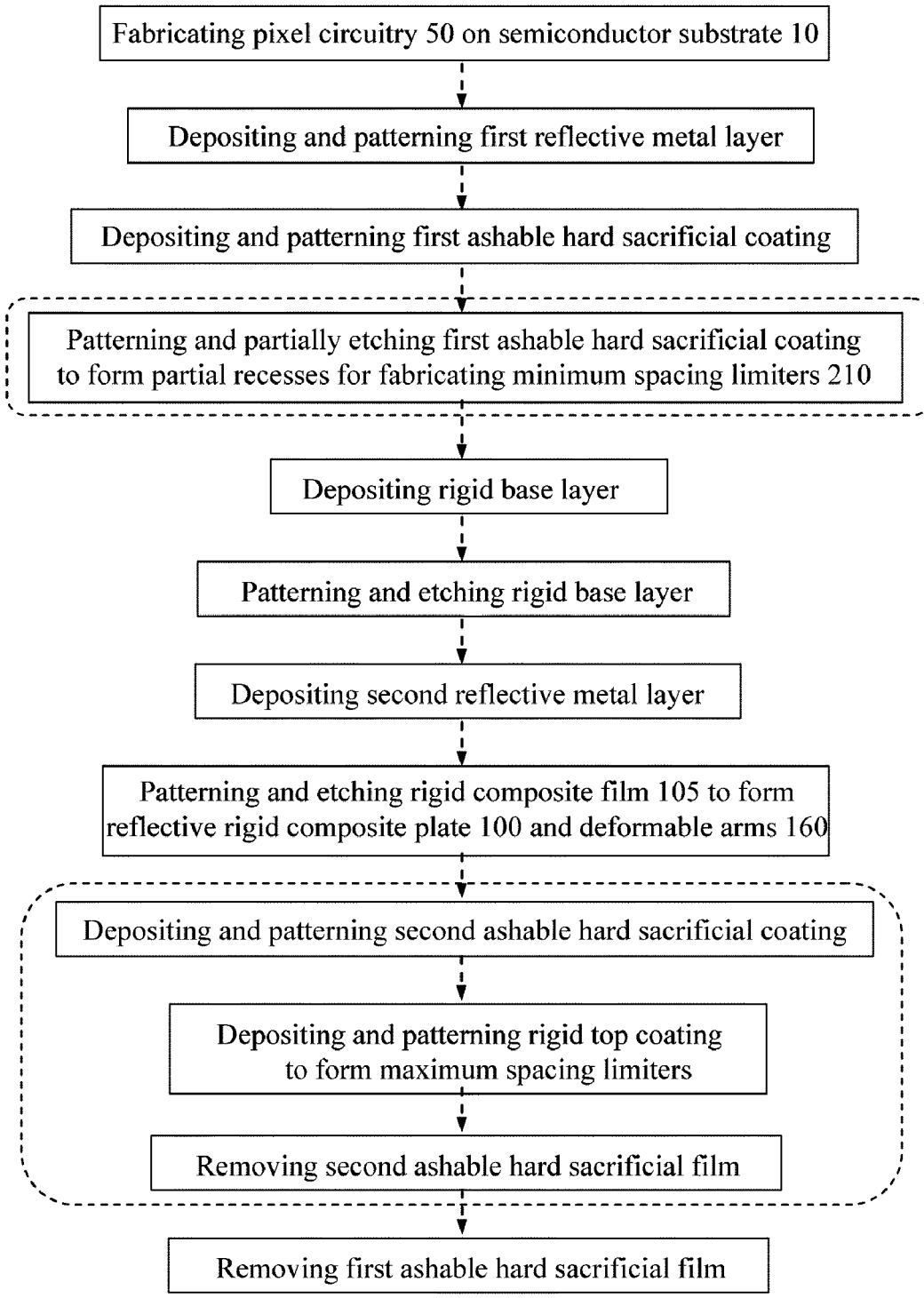
FIG. 5 is a block diagram illustrating the means and process sequence for fabricating a spatial optical modulation array device in two additional embodiments disclosed in this invention incorporating sets of spacing limiters between a top metal reflector and a static bottom metal reflector.

FIG. 5 illustrates a method for further fabricating the minimum spacing limiters 210 and the maximum spacing limiters 220 shown in FIGS. 2a, 2b and 2c, as additional features to the micro optical-electrical-mechanical pixel 20 depicted in FIG. 1. In order to form the minimum spacing limiters 210, the method may further include the following steps after depositing and patterning the first ashable hard sacrificial coating but before depositing the rigid base layer as mentioned above: patterning and partially etching the first ashable hard sacrificial film to form a set of partial recesses on top of first ashable hard sacrificial film for fabricating the minimum spacing limiters 210.

Similarly, in order to form the maximum spacing limiters 220, the method may further include the following steps: 1) depositing and photolithographically patterning an second ashable hard sacrificial coating conformal onto the rigid composite film and the semiconductor substrate 10 to form a second ashable hard sacrificial film; 2) depositing and photolithographically patterning a rigid top coating to form the set of maximum spacing limiters 220; 3) removing the second ashable hard sacrificial film underneath the set of maximum spacing limiters 220 and the first ashable hard sacrificial film simultaneously by ashing. Those additional processing steps for forming the maximum spacing limiters 220 can also be accomplished before pattering and etching the rigid composite film for forming the reflective rigid composite plate 100 and bendable arms 160.

Figure 6:
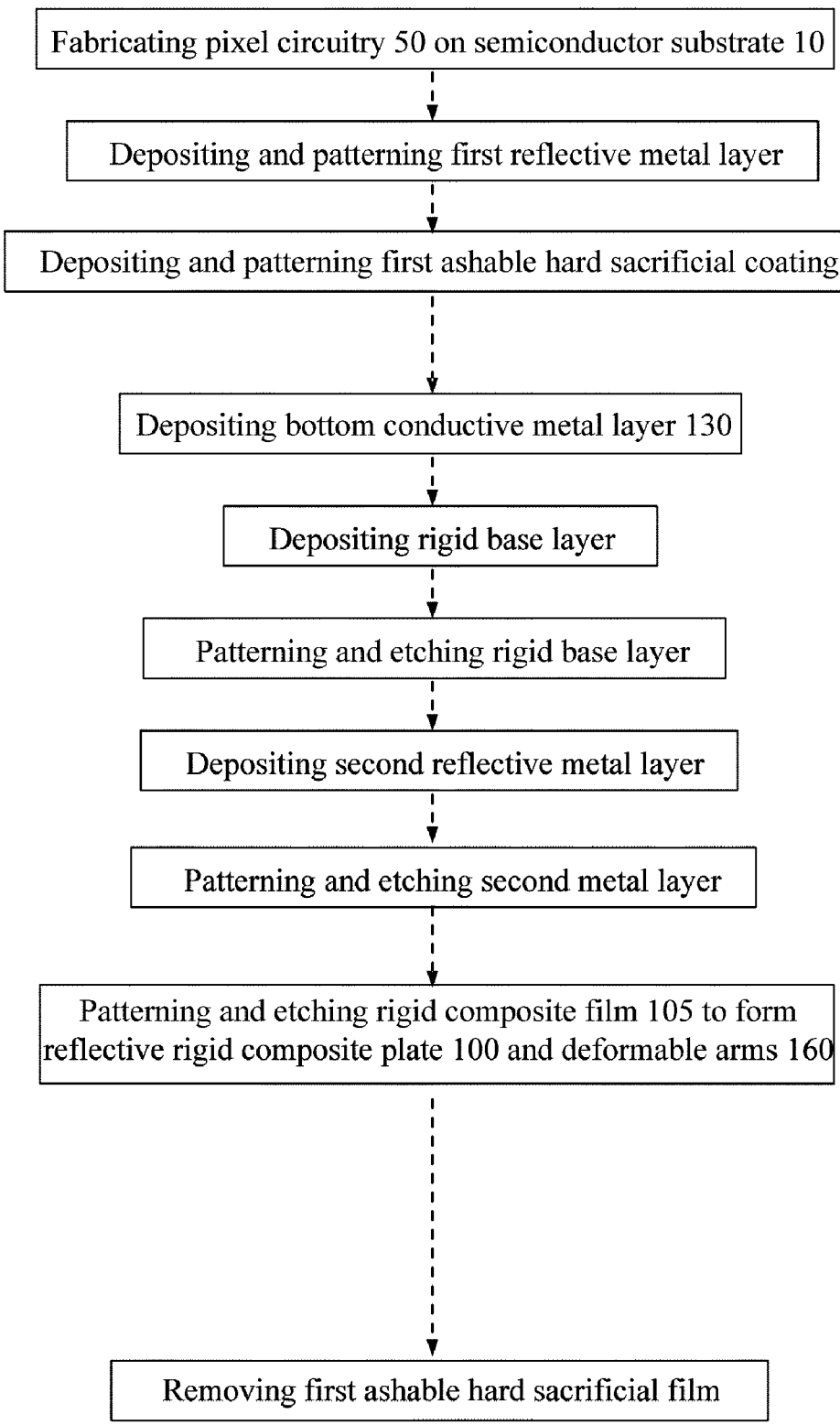
FIG. 6 is a block diagram illustrating the means and process sequence for further fabricating the tri-layer structure of the rigid composite plate 110, in an additional embodiment disclosed in this invention.

FIG. 6 illustrates a method for further fabricating the trilayer structure of the rigid composite plate 100. The method may include the following steps after depositing and patterning the first ashable hard sacrificial coating and before removing it: 1) depositing a bottom conductive metal layer 130; 2) depositing a rigid base layer; 3) photolithographically patterning and selectively etching the rigid base layer; 4) depositing a second reflective metal layer; 5) patterning and etching the second reflective metal layer to form a rigid composite film; 6) patterning and etching the rigid composite film to form the reflective rigid composite plate 100 and bendable arms 160, the bendable arms 160 not being covered by the second reflective metal layer and thus not optical reflective to incident illumination.

Besides, an embodiment of the present invention provides a method of modulating and reflecting two dimensional incident illumination 900. The method may includes the steps of: 1) inducing the incident illumination 900 to impinge upon the above-mentioned spatial optical modulation array device 5; 2) moving the reflective rigid composite plate to a minimum spacing 910 from the static bottom metal reflector 90 thereby limited by the set of minimum spacing limiters 210, by applying attractive charging via the pixel circuitry 50 to the static bottom metal reflector 90 and the top metal reflector 120, in which the minimum spacing is equal or close to an odd multiple of a quarter wavelength within visible light spectrum to diffract the incident illumination through the apertures 150 on the rigid composite plate 100; 3) moving the reflective rigid composite plate 100 to a maximum spacing 920 from the static bottom metal reflector 90 thereby limited by the set of maximum spacing limiters 220, by applying compulsive charging via the pixel circuitry 50 to the static bottom metal reflector 90 and the top metal reflector 120, the maximum spacing equal or close to an even multiple of a quarter wavelength within visible light spectrum to reflect the incident illumination 900 though the apertures 150 on the reflective rigid composite plate 100.

The aforementioned description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A spatial optical modulation array device, comprising a plurality of regularly tiled micro optical-electrical-mechanical pixels on a semiconductor substrate, wherein each of the micro optical-electrical-mechanical pixels comprises:

an optically reflective and electrically conductive static bottom metal reflector deposited on top of the semiconductor substrate and electrically connected to a pixel circuitry in the semiconductor substrate;

a vertically movable reflective rigid composite plate, suspended above the static bottom metal reflector and spaced in parallel apart in relation thereto, containing one or multiple apertures letting incident illumination through to the static bottom metal reflector underneath, wherein the reflective rigid composite plate further comprises a rigid base plate and a top metal reflector which is optical reflective, electrically conductive, and facing the incident illumination;

a set of continuously bendable arms, mechanically connecting the reflective rigid composite plate to the semiconductor substrate and electrically wiring the top metal reflector to the pixel circuitry;

wherein the reflective rigid composite plate electrically actuated by the pixel circuitry, moves vertically but relatively parallel to and results in change of spacing from the static bottom metal reflector.

2. The device according to claim 1, wherein the apertures are sized and shaped to define an area with reflectivity substantially equal to reflectivity of an area of the top metal reflector surrounding the apertures.

3. The device according to claim 1, wherein the pixel circuitry is configured to create an electrostatic force, compulsive or contractive, between the static bottom metal reflector on the semiconductor substrate and the top metal reflector on the reflective rigid composite plate to move the reflective rigid composite plate vertically relatively and in parallel to the static bottom metal reflector.

4. The device according to claim 1, wherein each of the micro optical-electrical-mechanical pixels further comprises at least one set of the following spacing limiters:

at least one minimum spacing limiter configured to physically limit the minimum spacing between the static bottom metal reflector and the top metal reflector equal to n*lambda/4; and at least one maximum spacing limiter configured to physically limit the maximum spacing between the static bottom metal reflector and the top metal reflector equal to m*lambda/4;

where lambda is a particular wavelength of light of visible spectrum incident on the top metal reflector and potion of the static bottom metal reflector, n is an odd integer equal or larger than 1, and m is an even number equal or larger than 2.

5. The device according to claim 1, wherein each of the apertures through the reflective rigid composite plate is shaped in any one of planner closed figures comprising circle, ring, ellipse, and polygon.

6. The device according to claim 1, wherein the reflective rigid composite plate further comprises: a bottom conductive metal plate adhered to the rigid base plate and opposite to the top metal reflector, continuously extended adherent to bottom of the bendable arms to provide electrical connection to the pixel circuitry in the semiconductor substrate.

7. The device according to claim 6, wherein the bottom conductive metal plate is made of any or combination of metal elements comprising aluminum, titanium, cobalt and copper as well as their alloys and conductive compounds.

8. The device according to claim 6, wherein the rigid base plate is made of a dielectric with high elastic modulus.

9. The device according to claim 8, wherein the dielectric is silicon oxide, silicon nitride or silicon carbide.

10. The device according to claim 1, wherein the bendable arms and the rigid base plate are exposed to but absorbs the incident illumination.

11. The device according to claim 1, wherein the static bottom metal reflector and the top metal reflector are made of reflective metal or metal alloys comprising aluminum and aluminum alloys, silver and silver alloys.

12. A method of fabricating a micro optical-electrical-mechanical pixel in claim 1, comprising:
- depositing and photolithographically patterning a first reflective metal layer on the semiconductor substrate to form the static bottom metal reflector;
- depositing and photolithographically patterning a first ashable hard sacrificial coating conformal onto the static bottom metal reflector and the semiconductor substrate to form a first ashable hard sacrificial film;
- depositing a rigid base layer conformal onto the first ashable hard sacrificial film and the semiconductor substrate continuously;
- photolithographically patterning and selectively etching the rigid base layer to form openings for the electrical wiring to the pixel circuitry;
- depositing a second reflective metal layer conformably onto the rigid base layer to form a rigid composite film on the patterned first ashable hard sacrificial film and the semiconductor substrate;
- photolithographically patterning the rigid composite film to form the reflective rigid composite plate and the associating bendable arms; and
- removing the first ashable hard sacrificial film underneath the reflective rigid composite plate by ashing.

13. The method according to claim 12, wherein after depositing and patterning the first ashable hard sacrificial coating but before depositing the rigid base layer, the method further comprises:
- photolithographically patterning the first ashable hard sacrificial coating; and
- partially etching the first ashable hard sacrificial coating to form a set of partial recesses on top of the first ashable hard sacrificial coating for fabricating the minimum spacing limiters.

14. The method according to claim 13, wherein after photolithographically patterning the rigid composite film, the method further comprises:
- depositing and photolithographically patterning an second ashable hard sacrificial coating conformal onto the rigid composite film, and exposing part of the first ashable hard sacrificial film and the semiconductor substrate to form a second ashable hard sacrificial film;
- depositing and photolithographically patterning a rigid top coating to form the set of maximum spacing limiters; and
- removing the second ashable hard sacrificial film underneath the set of maximum spacing limiters and the first ashable hard sacrificial film simultaneously by ashing.

15. The method according to claim 12, wherein after depositing and patterning the first ashable hard sacrificial coating but before depositing the rigid base layer and the second reflective metal layer, the method further comprises:
- depositing a bottom conductive metal layer; and
- photolithographically patterning and selectively removing the bottom conductive metal layer on top of the bendable arms by etching.

16. A method of modulating and reflecting two dimensional incident illumination, comprising:
- inducing the incident illumination to impinge upon the spatial optical modulation array device of claim 1;
- moving the reflective rigid composite plate to a minimum spacing from the static bottom metal reflector thereby limited by the set of minimum spacing limiters, by applying attractive charging via the pixel circuitry to the static bottom metal reflector and the top metal reflector, wherein the minimum spacing equal or close to an odd multiple of a quarter wavelength within visible light spectrum to diffract the incident illumination through the apertures on the rigid composite plate; and
- moving the reflective rigid composite plate to a maximum spacing from the static bottom metal reflector thereby limited by the set of maximum spacing limiters, by applying compulsive charging via the pixel circuitry to the static bottom metal reflector and the top metal reflector, the maximum spacing equal or close to an even multiple of a quarter wavelength within visible light spectrum to reflect the incident illumination through the apertures on the reflective rigid composite plate.

* * * * *